Jan. 8, 1929.
A. H. SIMMONS
1,698,282
ELECTRIC HEATER
Filed Nov. 28, 1925
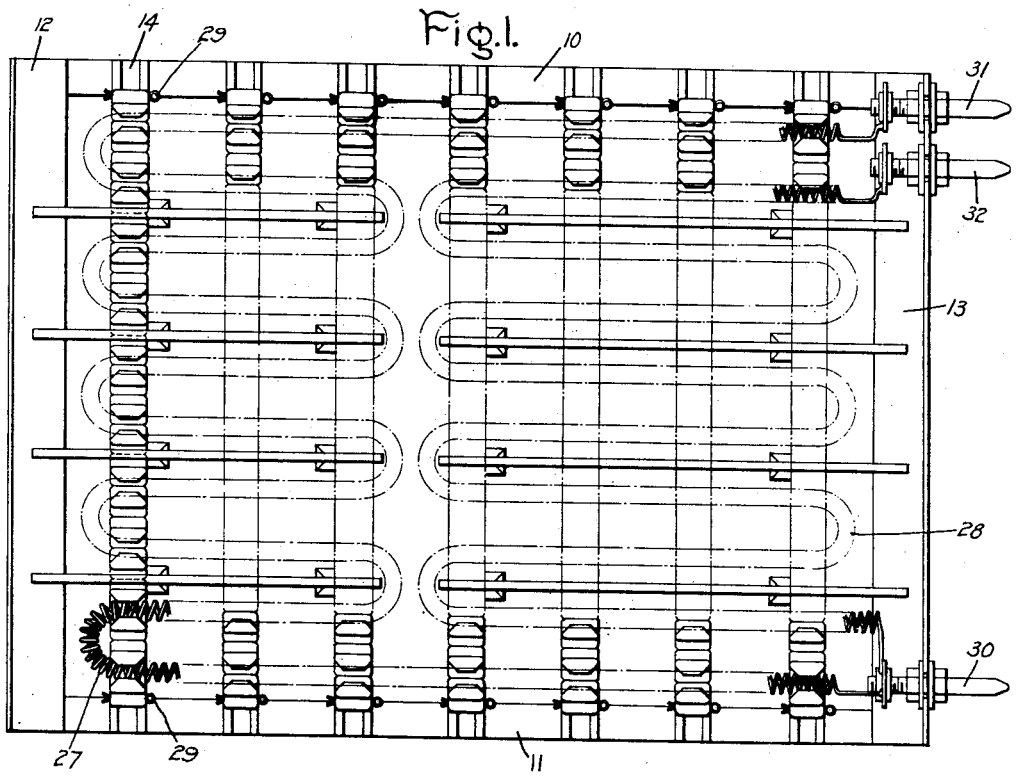
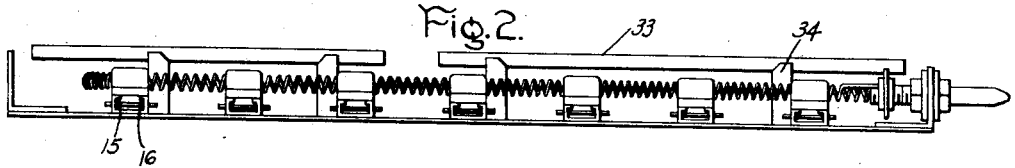
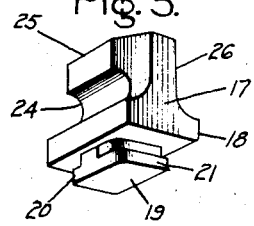
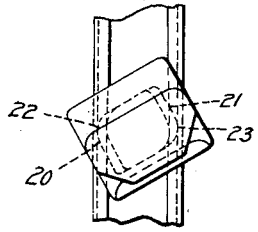
Inventor:
Albert H. Simmons,
by
His Attorney.

Patented Jan. 8, 1929.

1,698,282

UNITED STATES PATENT OFFICE.

ALBERT H. SIMMONS, OF WHEATON, ILLINOIS, ASSIGNOR TO EDISON ELECTRIC APPLIANCE COMPANY, INCORPORATED, OF CHICAGO, ILLINOIS, A CORPORATION OF NEW YORK.

ELECTRIC HEATER.

Application filed November 28, 1925. Serial No. 72,003.

My invention relates to electric heaters and has for its object the provision of improved means for supporting the heating resitsance.

My invention has particular application to electric heaters or heating units of the flat horizontal type, such as are sometimes used in electric baking ovens, although it has application also to various other forms of heating units used for different purposes.

In carrying out my invention, I provide a plurality of supports secured in a suitable groove and mount the resitsance conductor between the supports. In one form of my invention the insulating supports are detachably secured in undercut grooves by turning them, whereby the supports are interlocked with the undercut walls of the grooves.

For a more complete understanding of my invention reference should be had to the accompanying drawing in which Fig. 1 is a plan view of an electric heating unit embodying my invention; Fig. 2 is a side elevation view of the device shown in Fig. 1, while Figs. 3 and 4 are enlarged fragmentary views showing details of construction.

Referring to the drawing, in carrying out my invention in one form I provide a metallic supporting framework shown as substantially rectangular in shape and formed by side bars 10 and 11, which are joined at their ends by cross bars 12 and 13, the cross bars 12 and 13 being angle irons. Extending crosswise of the framework and forming a part thereof are channel bars 14, seven being shown, although obviously any suitable number may be provided. These channel bars are arranged in parallel with each other and parallel with the bars 12 and 13, their ends being secured to the side bars 10 and 11. As indicated in Fig. 2, the bars 14 are so constructed that their side walls extend inward toward each other slightly so as to form an undercut groove. It will be observed that the side walls are in effect bent over toward each other at the top to form overhanging portions 15 and 16.

The bars 14 form means for securing a plurality of supporting insulators or supports 17 to the framework. These insulators, as shown in Fig. 3, are provided with substantially rectangular bases 18, which rest on the bars 14. Extending downward centrally from the base is a projection 19 which is likewise substantially rectangular. The upper side of the projection 19 is cut away at opposite ends so as to form overhanging projections 20 and 21. The width of the projection 19, i. e., its dimension in a direction parallel with the projections 20 and 21, is slightly less than the upper opening of the undercut grooves in the bars 14, i. e., the distance between the overhanging projections 15 and 16, so that the projection 19 can be slipped freely into the groove from above after which the support is secured by turning it through a 90° angle, which brings the projections 20 and 21 underneath the overhanging side wall projections 15 and 16. This secures the supports against appreciable displacement in a vertical diretcion although the dimensions of the projection 19 are such that the supports may be slipped freely along the grooves. To facilitate the turning of the support after it has been placed in the groove two diagonally opposite corners of the projection 19 are rounded off as indicated at 22 and 23.

On the upper end of each support 17 is a lateral projection or overhanging portion whereby a recess or groove 24 is formed in one side of the support, this groove having curved side walls. The overhanging projection 25 thus formed terminates a short distance behind the adjacent side of the base 18, as shown in Fig. 1. The support may also be cut away somewhat at the side opposite the projection 25, as indicated by the reference numeral 26.

The insulating supports 17 are inserted in the grooves in the bars 14 in pairs, the overhanging projections 25 of each pair facing each other. A helical resistance conductor 27 extends back and forth in a plurality of substantially parallel lengths between the rows of supports secured to the bars 14. This resistance conductor lies in the grooves 24 of the pairs of supports, and it is thereby secured in place and supported at intervals determined by the distance between the bars 14. It will be observed that the projections 25 of each pair of supports are spaced apart to provide for radiation of heat upward from the portion of the resistance conductor between the supports.

The supports 17 are slipped in the grooves with their bases 18 in engagement with each other and are secured against displacement in the direction of the groove by cotter pins 29 in the ends of the bars 14. This arrangement of the supports in engagement with each other prevents their being turned and they are thus firmly secured in the grooves. In the event of damage to anyone of the supports it will be observed that this support can be removed by simply taking out one of the cotter pins 29 in the bar 14 in which the support is mounted, slipping the adjoining insulators to one side for a short distance to permit turning of the damaged one through a 90° angle, after which it may be removed and a new one put in place and secured by turning it. The adjoining insulators are then pushed back into place and the cotter pin inserted.

In the arrangement shown the resistance conductor is divided into two similar sections, the section 27 extending transversely of the three outer bars 14 of the heating unit, i. e., the three bars adjacent the end bar 12, and the section 28 extending transversely of the four bars 14 at the back end of the heating unit. These two sections are connected at one end to a terminal pin 30, which is secured to the upright side of the bar 13 in insulated relation therewith. The other ends of the sections are connected to terminal pins 31 and 32 respectively.

This arrangement of the heating resistance into sections provides for flexibility in connecting it to the electric power source so as to obtain varying rates of heat generation. For example, the two sections may be connected in parallel for high heat, in series for low heat, and only one section may be connected for medium heat.

As thus constructed the heating unit is adapted to be slid into the oven or other heating space on ledges or guideways at the sides on which the bars 10 and 11 rest, for instance as shown in the Ruckle Patent 1,203,909, dated November 7, 1916, the bar 13 being inserted first and the terminal pins 30, 31 and 32 making contact with suitable contact receptacles mounted in the back of the heating space when the heating unit has been pushed in place. When the unit is used in the bottom of the oven, bars 33 may be provided extending above the heating resistance from the front toward the back on which the articles to be heated may be placed. These bars are mounted on supporting members 34, which are secured at suitable intervals to the bars 14. The bars 33 are situated a short distance above the heating resistances so as to be insulated therefrom.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. In an electric heater, a supporting member provided with an undercut groove, a plurality of supports for a resistance conductor, said supports being provided with projections arranged to be inserted laterally in said groove and turned to interlock with the walls thereof.

2. In an electric heater, a metallic framework, channel shaped members constituting a part of said framework provided with overhanging side walls forming undercut grooves, a plurality of insulating supports for a resistance conductor, said supports provided with laterally projecting base portions arranged to be inserted between the overhanging side walls of said groove and turned to interlock therewith.

3. In an electric heater, a supporting member provided with a plurality of undercut grooves, a plurality of supports for a resistance conductor, said supports provided with lateral projections adapted to be inserted in said grooves and turned to interlock therewith.

4. In an electric heater, a supporting member provided with a plurality of undercut grooves, a plurality of supports for a resistance conductor, said supports provided with lateral projections adapted to be inserted in said grooves and turned to interlock therewith, said supports being provided with side recesses and arranged in pairs with the recesses of each pair opposite each other.

5. The combination in an electric heating unit, of a supporting member, an undercut groove in said supporting member, a plurality of supports for a resistance conductor, said supports provided with lateral projections inserted in said groove and turned to interlock with the walls thereof, and means for securing said supports to prevent turning thereof.

6. The combination in an electric heating unit, of a member provided with an undercut groove, a plurality of insulating supports for a resistance conductor, said supports provided with laterally projecting base portions arranged to be inserted between the overhanging side walls of said groove and turned to interlock therewith, said base portions being arranged to cooperate to prevent turning of said supports, and means for securing said supports in engagement with each other to prevent turning thereof.

7. In an electric heater, a metallic supporting framework including channel shaped members provided with overhanging side walls forming undercut grooves, insulating supports for a resistance conductor, said supports provided with base portions arranged to be inserted between the overhanging side walls of said grooves, lateral projections on the base portions of said supports arranged to interlock with said overhanging side walls by turning said supports whereby said supports are secured to said framework, overhanging projections on said supports, said supports being arranged in pairs in said grooves with the overhanging projections of each pair facing each other.

In witness whereof, I have hereunto set my hand this 21st day of November, 1925.

ALBERT H. SIMMONS.